United States Patent
Yuasa

(10) Patent No.: US 10,447,086 B2
(45) Date of Patent: Oct. 15, 2019

(54) POWER TRANSMISSION DEVICE, METHOD FOR MANUFACTURING THE SAME, POWER RECEPTION DEVICE AND METHOD FOR MANUFACTURING THE SAME

(71) Applicant: TOYOTA JIDOSHA KABUSHIKI KAISHA, Toyota-shi, Aichi-ken (JP)

(72) Inventor: Hiroaki Yuasa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 418 days.

(21) Appl. No.: 15/503,410

(22) PCT Filed: Jul. 1, 2015

(86) PCT No.: PCT/JP2015/068955
§ 371 (c)(1),
(2) Date: Feb. 13, 2017

(87) PCT Pub. No.: WO2016/027570
PCT Pub. Date: Feb. 25, 2016

(65) Prior Publication Data
US 2017/0237295 A1    Aug. 17, 2017

(30) Foreign Application Priority Data

Aug. 20, 2014 (JP) .................. 2014-167671

(51) Int. Cl.
*H01F 27/42* (2006.01)
*H01F 38/00* (2006.01)
(Continued)

(52) U.S. Cl.
CPC .............. *H02J 50/12* (2016.02); *B60L 53/12* (2019.02); *H01F 27/02* (2013.01); *H01F 27/04* (2013.01);
(Continued)

(58) Field of Classification Search
CPC .. B60L 53/12; B60L 5/00; B60L 50/50; H01F 27/02; H01F 27/04; H01F 27/24;
(Continued)

(56) References Cited

U.S. PATENT DOCUMENTS

| 7,741,734 B2 | 6/2010 | Joannopoulos et al. |
| 2007/0222542 A1 | 9/2007 | Joannopoulos et al. |

(Continued)

FOREIGN PATENT DOCUMENTS

| AU | 2006269374 B2 | 10/2009 |
| AU | 2007349874 A2 | 1/2010 |

(Continued)

OTHER PUBLICATIONS

Sep. 15, 2015 Written Opinion issued in International Patent Application No. PCT/JP2015/068955.

*Primary Examiner* — Rexford N Barnie
*Assistant Examiner* — Toan T Vu
(74) *Attorney, Agent, or Firm* — Oliff PLC

(57) ABSTRACT

A power transmission device that transmits electric power to a power reception device in a contactless manner includes a power transmission coil unit, an electrical device connected to the power transmission coil unit, and an enclosure storing the power transmission coil unit and the electrical device. The enclosure includes an installation wall, an outer wall, a partitioning wall, and a cover portion closing an opening formed in a power transmission surface of the outer wall and allowing transmission of electric power by the power transmission coil unit. The partitioning wall is provided to partition the space in the enclosure into a coil-unit storing portion in which the cover portion is located and the power transmission coil unit is stored, and an electrical-device storing portion in which the electrical device is stored. The outer wall and the partitioning wall are made of metal.

14 Claims, 12 Drawing Sheets

(51) Int. Cl.
  *H02J 50/12* (2016.01)
  *H01F 38/14* (2006.01)
  *H01F 27/02* (2006.01)
  *H01F 27/36* (2006.01)
  *H01F 27/04* (2006.01)
  *H01F 27/24* (2006.01)
  *H01F 27/28* (2006.01)
  *H02J 5/00* (2016.01)
  *B60L 53/12* (2019.01)
  *B60L 5/00* (2006.01)
  *B60M 7/00* (2006.01)
  *B60L 50/50* (2019.01)

(52) U.S. Cl.
  CPC ......... *H01F 27/24* (2013.01); *H01F 27/2804* (2013.01); *H01F 27/36* (2013.01); *H01F 38/14* (2013.01); *H02J 5/005* (2013.01); *B60L 5/00* (2013.01); *B60L 50/50* (2019.02); *B60M 7/00* (2013.01)

(58) Field of Classification Search
  CPC ...... H01F 27/2804; H01F 27/36; H01F 38/14; H02J 5/005; H02J 50/12; B60M 7/00
  USPC .......................................................... 307/104
  See application file for complete search history.

(56) References Cited

U.S. PATENT DOCUMENTS

| | | |
|---|---|---|
| 2008/0197956 A1 | 8/2008 | Hasegawa et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1 | 8/2013 | Nakamura et al. |
| 2015/0008877 A1 | 1/2015 | Ichikawa et al. |

FOREIGN PATENT DOCUMENTS

| | | | |
|---|---|---|---|
| AU | 2010200044 A1 | 1/2010 | |
| AU | 2006269374 C1 | 3/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101860089 A | 10/2010 | |
| EP | 1 902 505 A2 | 3/2008 | |
| EP | 2 130 287 A1 | 12/2009 | |
| IN | 735/DELNP/2008 | 9/2008 | |
| IN | 6195/DELNP/2009 | 2/2010 | |
| JP | 2008-235860 A | 10/2008 | |
| JP | 2009-501510 A | 1/2009 | |
| JP | 2013-110822 A | 6/2013 | |
| JP | 2013-126327 A | 6/2013 | |
| JP | 2013-146148 A | 7/2013 | |
| JP | 2013-146154 A | 7/2013 | |
| JP | 2013-154815 A | 8/2013 | |
| JP | 2014-039369 A | 2/2014 | |
| JP | 2014-087136 A | 5/2014 | |
| KR | 2008-0031398 A | 4/2008 | |
| KR | 2010-0015954 A | 2/2010 | |
| WO | 2007008646 A2 | 1/2007 | |
| WO | 2008118178 A1 | 10/2008 | |
| WO | 2013/125372 A1 | 8/2013 | |
| WO | WO-2013125372 A1 * | 8/2013 | ............ H02J 7/0042 |
| WO | 2013/142056 A1 | 9/2013 | |

* cited by examiner

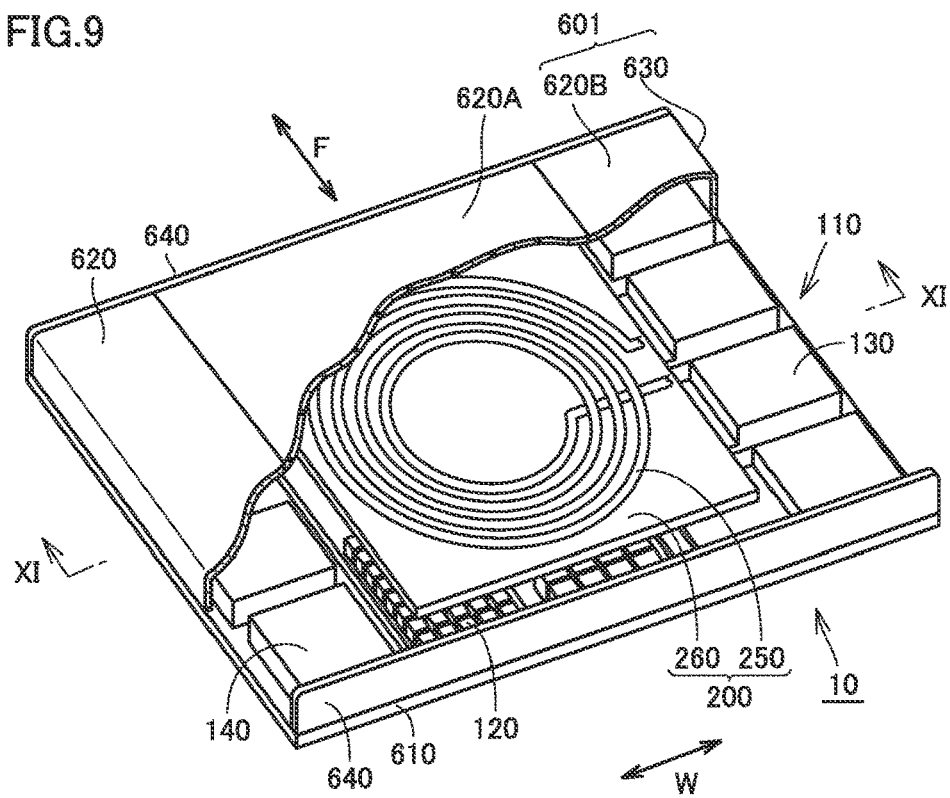
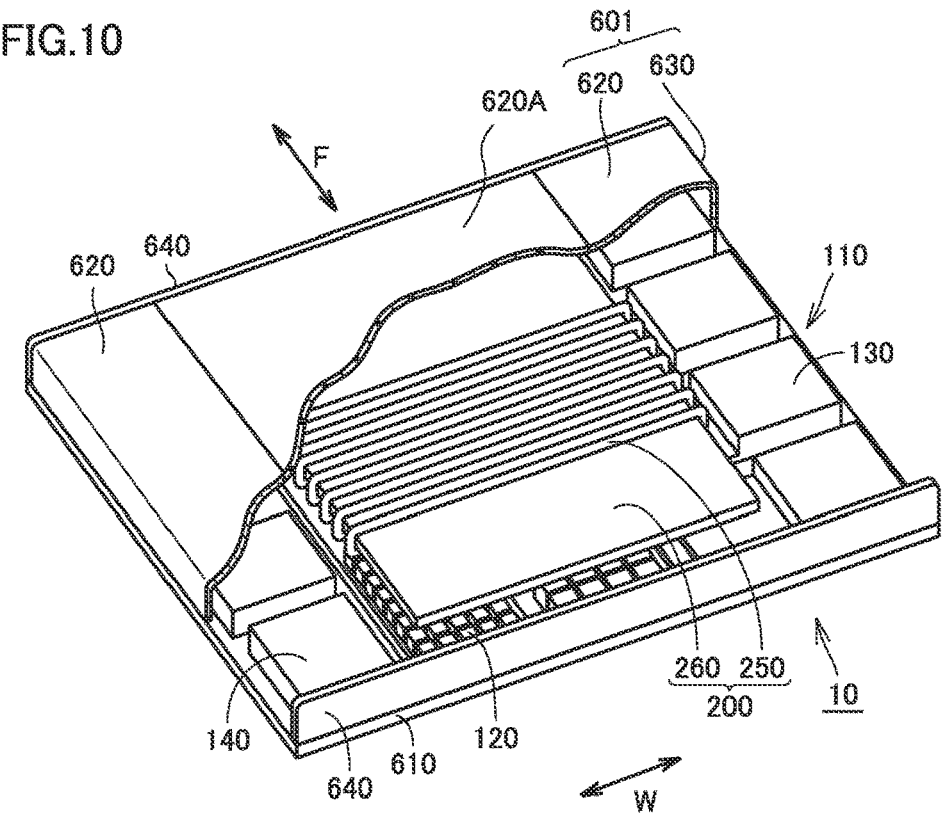

POWER TRANSMISSION DEVICE, METHOD FOR MANUFACTURING THE SAME, POWER RECEPTION DEVICE AND METHOD FOR MANUFACTURING THE SAME

TECHNICAL FIELD

The present invention relates to a power transmission device that transmits electric power to a power reception device in a contactless manner and a method for manufacturing the same, as well as a power reception device that receives electric power from a power transmission device in a contactless manner and a method for manufacturing the same.

BACKGROUND ART

As disclosed in PTD 1 to PTD 5, a power transfer system is known in which a power transmission device and a power reception device that receive and transmit electric power in a contactless manner are used. PTD 6 relates to a contactless battery charger for conveying electric power by an electromagnetic induction effect to charge a battery stored in a battery-driven device, such as a cellular phone, a smartphone or a tablet, in a contactless manner or wirelessly. A coil and a circuit board are stored in an exterior case. PTD 7 discloses a storage case in which a coil and a capacitor are stored, wherein a mounting surface is made of metal and a power transfer surface and its surroundings are made of resin.

CITATION LIST

Patent Document

PTD 1: Japanese Patent Laying-Open No. 2013-154815
PTD 2: Japanese Patent Laying-Open No. 2013-146154
PTD 3: Japanese Patent Laying-Open No. 2013-146148
PTD 4: Japanese Patent Laying-Open No. 2013-110822
PTD 5: Japanese Patent Laying-Open No. 2013-126327
PTD 6: Japanese Patent Laying-Open No. 2014-087136
PTD 7: Japanese Patent Laying-Open No. 2014-039369

SUMMARY OF INVENTION

Technical Problem

According to the structure described in PTD 6, a shield is merely formed in a flat plate shape, and inside the exterior case, a region where the coil is stored and a region where the circuit board is stored are not partitioned. As a result, an electromagnetic field produced by the coil may reach an electrical device within the exterior case, so that the electrical device may be affected by the electromagnetic field during power transfer. Furthermore, noise from the electrical device may leak to the outside to affect an external electrical device. Moreover, in the device described in each PTD mentioned above, a specific manufacturing method is not mentioned at all.

The present invention was made in view of the above-described problems, and has an object to provide a power transmission device and a method for manufacturing the same, as well as a power reception device and a method for manufacturing the same, in which, when a coil and an electrical device connected to the coil are stored in a single enclosure to integrate the coil and the electrical device, the influence on the electrical device due to an electromagnetic field during power transfer and leakage of noise from the electrical device to the outside can be reduced.

Solution to Problem

This power transmission device is a power transmission device that transmits electric power to a power reception device in a contactless manner, including a power transmission coil unit, an electrical device connected to the power transmission coil unit, and an enclosure configured to store the power transmission coil unit and the electrical device.

The enclosure includes an installation wall located on the side of an installation surface, an outer wall provided to cover the installation wall from the side of a side surface and leaving space in the enclosure, a partitioning wall configured to partition the space, and a cover portion configured to close an opening formed in a power transmission surface of the outer wall and to allow transmission of electric power by the power transmission coil unit. The partitioning wall is provided to partition the space in the enclosure into a coil-unit storing portion in which the cover portion is located and the power transmission coil unit is stored, and an electrical-device storing portion in which the electrical device is stored. The outer wall and the partitioning wall are made of metal.

According to this power transmission device, the power transmission coil unit and the electrical device are partitioned with the partitioning wall made of metal. As a result, during transmission of electric power, the electromagnetic field produced by the power transmission coil unit is inhibited from reaching the electrical device by the presence of the partitioning wall. Moreover, leakage of noise from the electrical device to the outside can also be reduced.

This method for manufacturing a power transmission device includes the steps of storing the electrical device in a main enclosure, closing, with the cover member, the opening in the main enclosure in which the electrical device is stored, arranging the power transmission coil unit on an inner side of the partitioning wall of the cover member, and closing an opening in the partitioning wall with the cover portion.

According to this method for manufacturing a power transmission device, a power transmission device having a structure in which a coil and an electrical device are integrated can be manufactured by simple steps.

This power reception device is a power reception device that receives electric power from a power transmission device in a contactless manner, including a power reception coil unit, an electrical device connected to the power reception coil unit, and an enclosure configured to store the power reception coil unit and the electrical device.

The enclosure includes an installation wall located on the side of an installation surface, an outer wall provided to cover the installation wall from the side of a side surface and leaving space in the enclosure, a partitioning wall configured to partition the space, and a cover portion configured to close an opening formed in a power reception surface of the outer wall and to allow reception of electric power by the power reception coil unit. The partitioning wall is provided to partition the space in the enclosure into a coil-unit storing portion in which the cover portion is located and the power reception coil unit is stored, and an electrical-device storing portion in which the electrical device is stored. The outer wall and the partitioning wall are made of metal.

According to this power reception device, the power reception coil unit and the electrical device are partitioned with the partitioning wall made of an electromagnetic-field shielding member. As a result, during reception of electric power, the electromagnetic field produced in the power reception coil unit is inhibited from reaching the electrical device by the presence of the partitioning wall. Moreover, leakage of noise from the electrical device to the outside can also be reduced.

This method for manufacturing a power reception device includes the steps of storing the electrical device in a main enclosure, closing, with the cover member, the opening in the main enclosure in which the electrical device is stored, arranging the power reception coil unit on an inner side of the partitioning wall of the cover member, and closing an opening in the partitioning wall with the cover portion.

According to this method for manufacturing a power reception device, a power reception device having a structure in which a coil and an electrical device are integrated can be manufactured by simple steps.

Advantageous Effects of Invention

The present invention can provide a power transmission device and a method for manufacturing the same, as well as a power reception device and a method for manufacturing the same, in which, when a coil and an electrical device connected to the coil are stored in a single enclosure to integrate the coil and the electrical device, the influence on the electrical device due to an electromagnetic field during power transfer and leakage of noise from the electrical device to the outside can be reduced.

BRIEF DESCRIPTION OF DRAWINGS

FIG. 9 is a perspective view showing a structure of a power reception device according to a third embodiment in which a spiral coil is adopted.

FIG. 10 is a perspective view showing a structure of the power reception device according to the third embodiment in which a wound-type coil is adopted.

DESCRIPTION OF EMBODIMENTS

Figure 1:
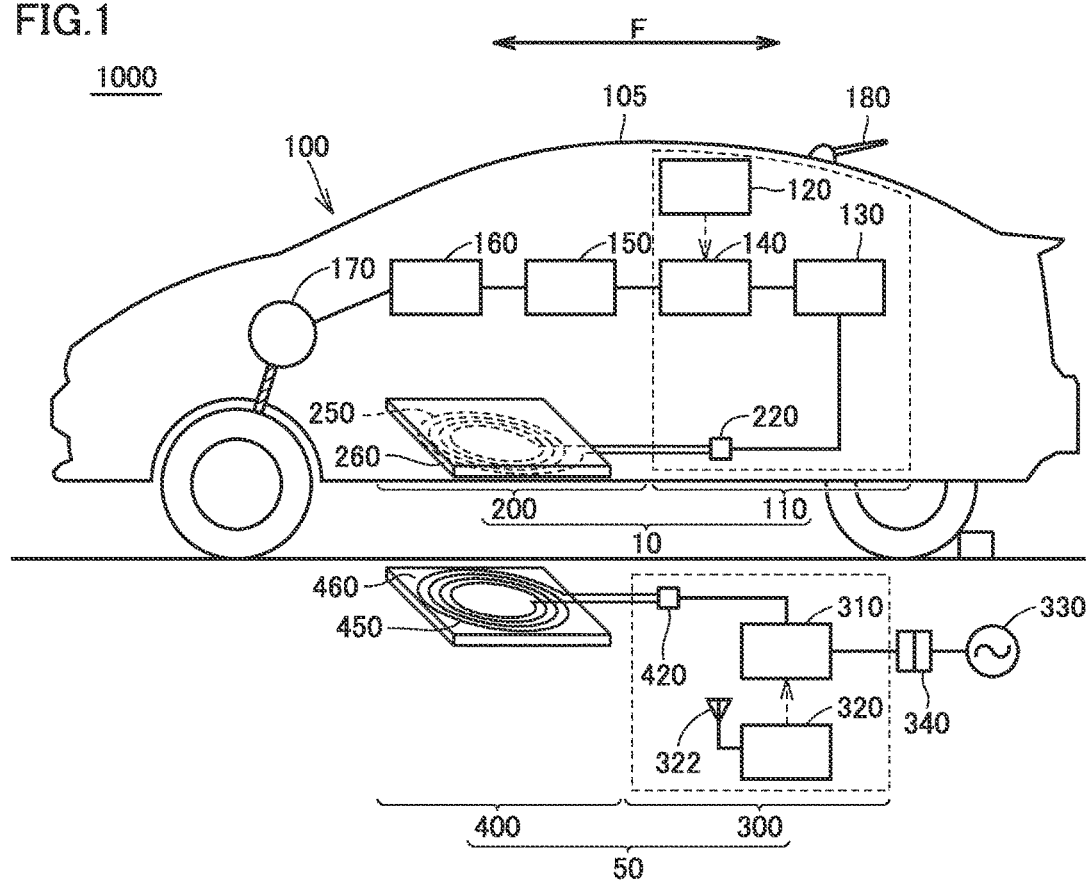
FIG. 1 is a diagram showing a power transfer system according to a first embodiment.

Embodiments in an example based on the present invention will each be described below with reference to the drawings. When the number, an amount or the like is mentioned in the embodiments described below, the scope of the present invention is not necessarily limited to that number, that amount or the like, unless otherwise specified. The same or corresponding parts have the same reference characters allotted, and description thereof may not be repeated. Combination as appropriate of features in the embodiments is originally encompassed. The drawings are not depicted in the actual dimensional proportion, and the proportion is changed in part in order to facilitate the understanding of structure.

The structure of a power transmission device installed on the installation side (such as a parking place) which will be described below is also applicable to a power reception device installed on the vehicle side. In the power transmission device, a mounting surface refers to the installation (ground) side, and a front surface side refers to the power reception device (vehicle) side. On the other hand, in the power reception device, the mounting surface refers to the vehicle side, and the front surface side refers to the power transmission device (ground) side.

In each of the drawings which will be referred to below, the directions indicated by arrows F in the drawings indicate the forward and backward directions of a vehicle, and the directions indicated by arrows W in the drawings indicate the width direction of a vehicle.

First Embodiment (Power Transfer System 1000)

Referring to FIG. 1, a power transfer system 1000 that transmits electric power in a contactless manner will be described. Power transfer system 1000 includes a power reception device 10 mounted on an electric vehicle 100, and a power transmission device 50 installed on the side of an installation such as a parking place. Electric vehicle 100 includes power reception device 10 and a vehicle body 105.

(Power Reception Device 10)

Power reception device 10 includes a power reception coil unit 200 and an electrical device 110 provided between power reception coil unit 200 and a battery 150 as a power storage device that stores electric power received by power reception coil unit 200. Power reception coil unit 200 has a power reception coil 250 and a flat ferrite plate 260. As will be described later, power reception coil 250 may be either a spiral coil (see FIG. 8) or a wound-type coil (see FIG. 9). FIG. 1 shows spiral power reception coil 250. Electrical device 110 has a capacitor 120, a rectifier 130, a DC/DC converter 140, and the like. In the illustration, power reception coil 250 and capacitor 120 are connected in series, but they may be connected in parallel.

Vehicle body 105 includes a battery 150 connected to DC/DC converter 140 of electrical device 110, a power control unit 160, a motor unit 170, a communication unit 180, and the like.

The number of turns of power reception coil 250 is appropriately set such that the distance between power reception coil 250 and a power transmission coil 450 which will be described below, a Q value (e.g., Q≥100) indicating the intensity of resonance between power reception coil 250 and power transmission coil 450 and a coupling coefficient κ indicating the degree of coupling thereof, and the like increase. Power reception coil 250 is connected to rectifier 130. Rectifier 130 converts an alternating current provided from power reception coil unit 200 into a direct current for supply to DC/DC converter 140.

(Power Transmission Device 50)

Power transmission device 50 includes a power transmission coil unit 400 and an electrical device 300. Power transmission coil unit 400 has power transmission coil 450 and a flat ferrite plate 460. Power transmission coil 450 may be either a spiral coil (see FIG. 2) or a wound-type coil (see FIG. 3). FIG. 1 shows spiral power transmission coil 450. Electrical device 300 includes a capacitor 420, a high-frequency power device 310, a power transmission ECU 320, and a communication unit 322. Electrical device 300 is detachably connected to an external AC power supply 330 through a receptacle plug 340 or the like. In the illustration, power transmission coil 450 and capacitor 420 are connected in series, but they may be connected in parallel.

High-frequency power device 310 converts electric power received from AC power supply 330 into high-frequency power, and supplies the converted high-frequency power to power transmission coil 450. Power transmission coil 450 transmits electric power to power reception coil 250 of power reception coil unit 200 in a contactless manner by electromagnetic induction.

(Details of Power Transmission Device 50)

Figure 2:
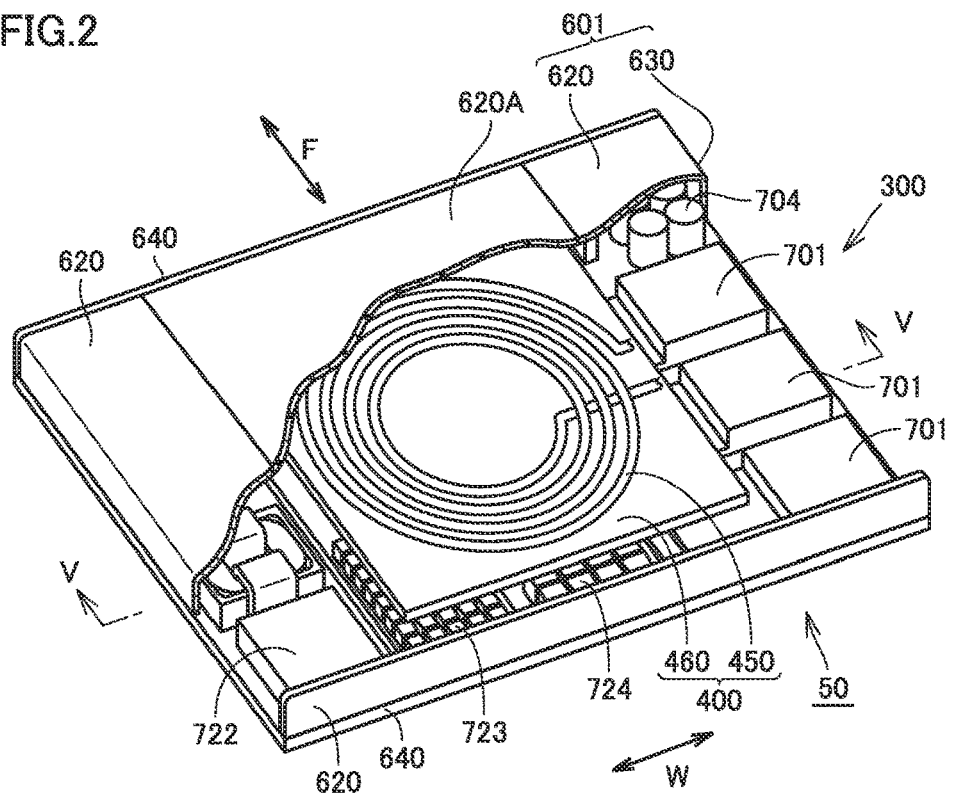
FIG. 2 is a perspective view showing a structure of a power transmission device according to the first embodiment in which a spiral coil is adopted.
Figure 3:
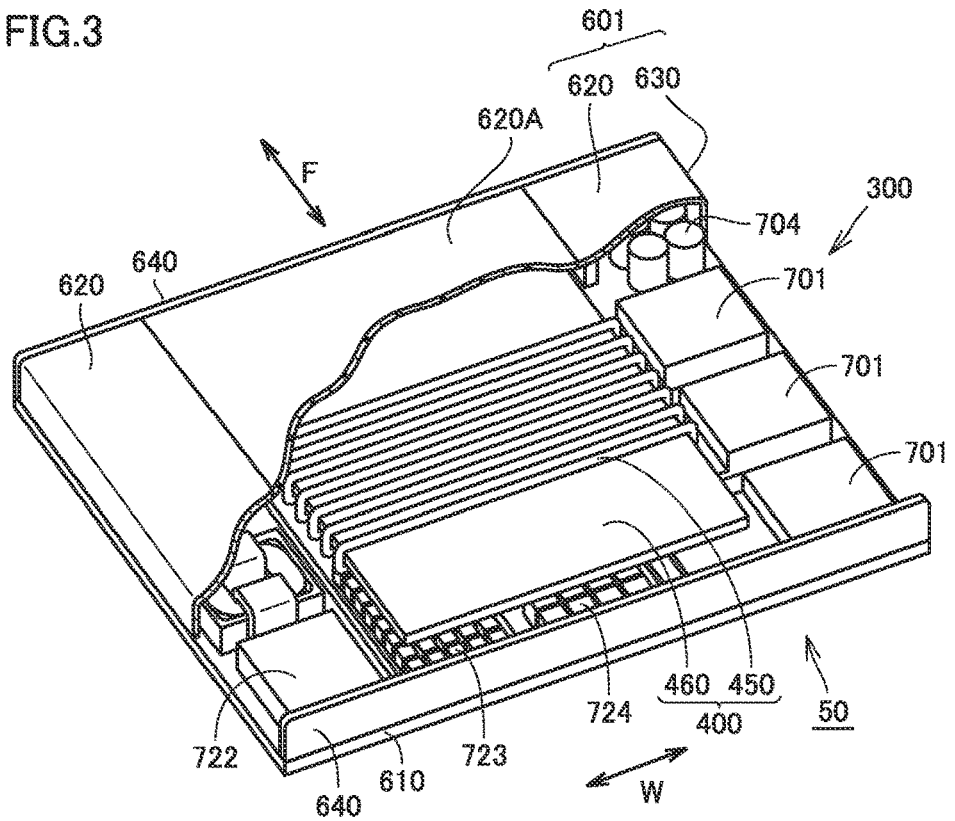
FIG. 3 is a perspective view showing a structure of the power transmission device according to the first embodiment in which a wound-type coil is adopted.
Figure 4:
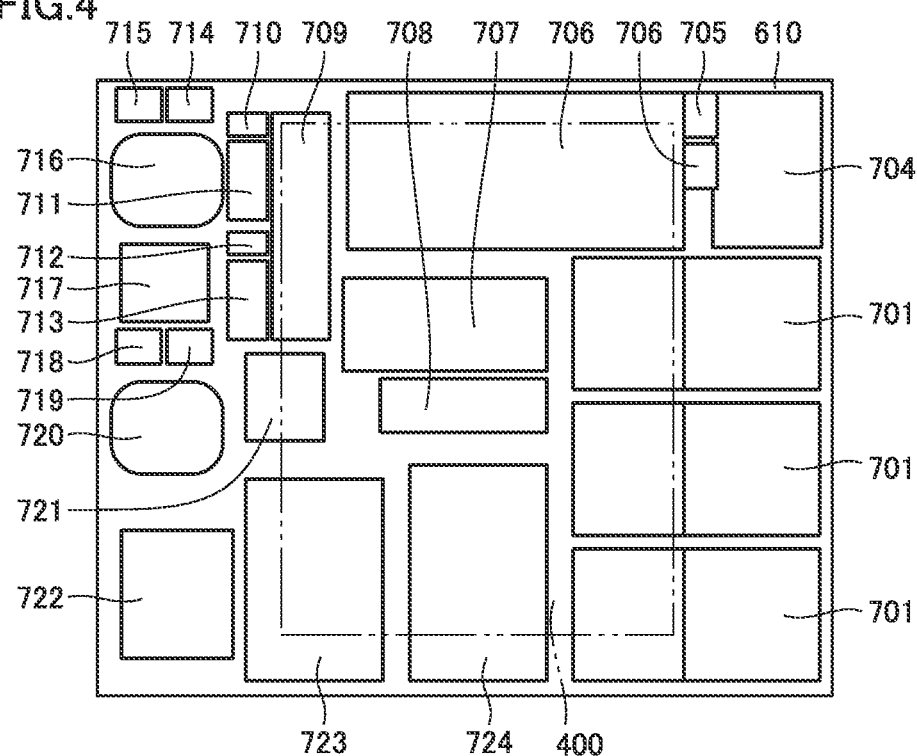
FIG. 4 is a diagram showing an arrangement of various devices of an electrical device according to the first embodiment.
Figure 5:
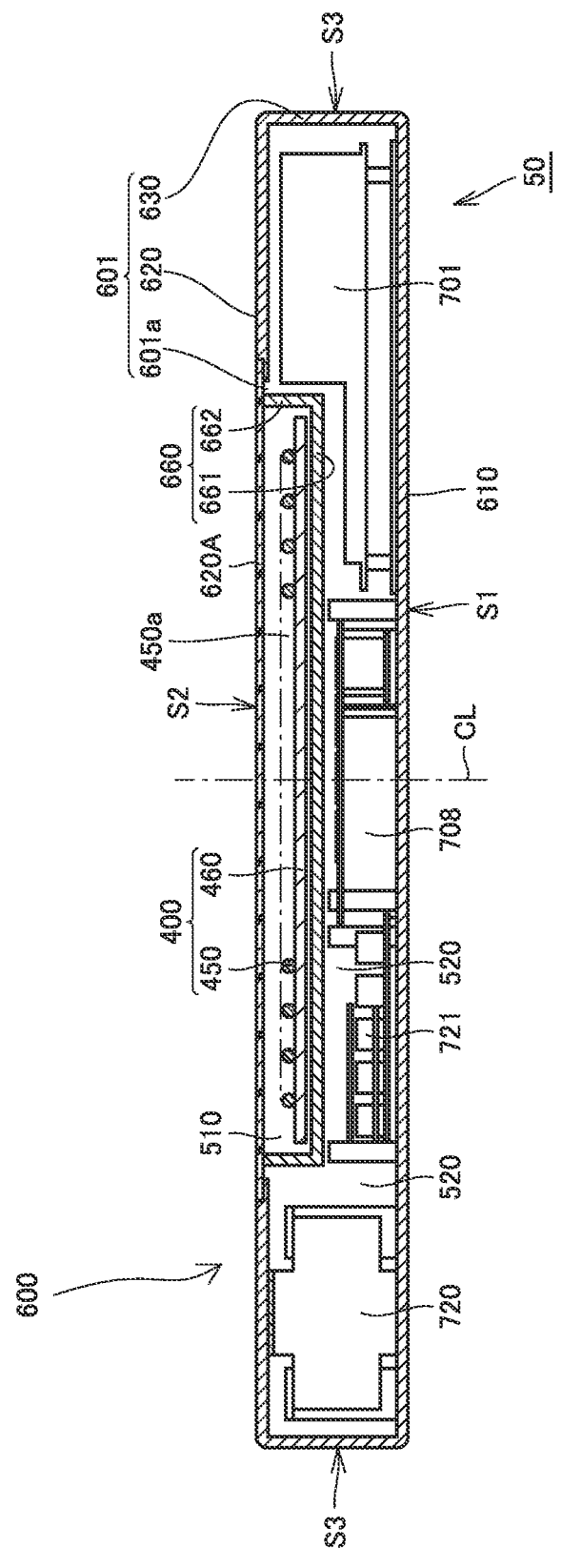
FIG. 5 is a diagram showing a cross-sectional structure of the power transmission device according to the first embodiment.

Referring to FIGS. 2 to 4, a detailed structure of power transmission device 50 according to the present embodiment will be described. FIG. 2 is a perspective view showing a structure of power transmission device 50 in which a spiral coil is adopted as the power transmission coil. FIG. 3 is a perspective view showing a structure of power transmission device 50 in which a wound-type coil is adopted as the power transmission coil. FIG. 4 is a diagram showing an arrangement of various devices of electrical device 300. FIG. 5 is a cross-sectional view taken along the arrows V-V in FIG. 2.

Power transmission device 50 has power transmission coil unit 400 that transmits electric power to power reception device 10 in a contactless manner as described above, and electrical device 300 that supplies electric power to power transmission coil unit 400 and is connected to an external power supply. These power transmission coil unit 400 and electrical device 300 are stored in an enclosure 600. Therefore, power transmission device 50 according to the present embodiment has a structure in which power transmission coil unit 400 and electrical device 300 are integrated.

Referring to FIGS. 2 to 4, in the present embodiment, electrical device 300 includes high-frequency power device 310, power transmission ECU 320 and communication unit 322 as shown in FIG. 1, and has components constituting these devices, such as a switching power supply 701, a PFC sub-substrate 704, a fan 705, a DC/RF portion 706, a 5V/15V power supply 707, a 24V power supply 708, a resonance capacitor 709, a fan 710, a heat sink 711, a fan 712, a heat sink 713, fans 714 and 715, filter inductors 716 and 720, fans 718 and 719, filter capacitors 717 and 721, an SCU 722, an interface 723, an input control unit 724, and the like.

Switching power supply 701 constitutes an AC/DC device portion. Filter inductors 716, 720 and filter capacitors 717, 721 constitute a filter device portion. DC/RF portion 706 constitutes a DC/RF device portion. These devices are mounted on an installation wall 610 constituting the bottom surface of enclosure 600.

Referring to FIG. 5, in the present embodiment, power transmission coil unit 400 and electrical device 300 are stored in enclosure 600. In this example shown in FIG. 5, power transmission coil 450 is a planar spiral coil formed to surround a winding centerline CL, and has a hole 450*a* formed in the central portion. Power transmission coil 450 is arranged such that winding centerline CL extends through a cover portion 620A and installation wall 610. In this example shown in FIG. 5, power transmission coil 450 is arranged such that winding centerline CL extends in the vertical direction. As power transmission coil 450, a helical coil arranged such that winding centerline CL extends in the vertical direction may be adopted.

Enclosure 600 has a flat box-like shape as a whole, and includes an installation surface S1 arranged on the ground side and a power transmission surface S2 arranged on the power reception device 10 side. Enclosure 600 includes installation wall 610 located on the installation surface S1 side, an outer wall 601 provided to cover installation wall 610 and leaving space within enclosure 600, and a partitioning wall 660 partitioning the space within enclosure 600.

Outer wall 601 includes a main surface wall 620 having an opening 601*a* formed in power transmission surface S2 and provided on the power transmission surface S2 side and a sidewall 630 located on the side surface S3 side. Sidewall 630 is located between installation wall 610 and main surface wall 620.

Partitioning wall 660 partitions enclosure 600 into a coil-unit storing portion 510 in which power transmission coil unit 400 provided on the power transmission surface S2 side is stored, and an electrical-device storing portion 520 in which electrical device 300 is stored.

Cover portion 620A that closes opening 601*a* is located in coil-unit storing portion 510. Cover portion 620A is made of resin or the like that transmits an electromagnetic field. Electric power can thereby be transmitted from power transmission coil unit 400 stored in coil-unit storing portion 510 to power reception coil unit 200.

Outer wall 601 is made of metal. Specifically, main surface wall 620, sidewall 630 and installation wall 610 are made of metal and molded integrally, and in the present embodiment, an aluminum member is used as an example. By making outer wall 601 of metal, it is possible to restrain noise originated in electrical device 300 stored in electrical-device storing portion 520 from leaking to the outside through outer wall 601.

Since installation wall 610 is generally installed on the ground, it is possible to restrain noise originated in electrical device 300 from leaking to the outside from the installation wall 610 side. In the example shown in FIG. 5, installation wall 610 is also made of metal to also restrain leakage of noise through installation wall 610.

In this example shown in FIG. 5, the whole surface of main surface wall 620 and the whole surface of sidewall 630 are made of metal, however, part of main surface wall 620 may be made of a porous plastic having waterproofness and air permeability, or the like.

That is, the expression "the outer wall is made of metal" in the specification of the present application is not limited to the case where the whole surface of outer wall 601 is made of metal, but also encompasses the case where part of outer wall 601 is made of an air-permeable plastic for ensuring air permeability and the case where part of outer wall 601 is made of glass or transparent resin for observing the interior.

Sidewall 630 is a side surface located in the width direction (W) of the vehicle. A sidewall 640 (see FIGS. 2 and 3) located in the forward direction/backward direction of the vehicle is implemented by an aluminum member of different composition from installation wall 610 and the like.

Partitioning wall 660 has a bottom wall 661 located on the installation wall 610 side and a sidewall 662 standing up from the both ends of bottom wall 661 toward cover portion 620A. Since partitioning wall 660 needs to prevent the occurrence of influence caused by an electromagnetic field on electrical device 300 stored in the same enclosure 600, partitioning wall 660 is implemented by an electromagnetic-field shielding member. Although a metal material is mainly adopted for the electromagnetic-field shielding member, copper is adopted in the present embodiment.

By partitioning enclosure 600 into coil-unit storing portion 510 in which power transmission coil unit 400 is stored and electrical-device storing portion 520 in which electrical device 300 is stored with partitioning wall 660 made of metal, it is possible to reduce the influence on electrical device 300 caused by an electromagnetic field during power transfer. For example, it is possible to prevent the temperature rise of electrical device 300 that would be caused by the occurrence of an eddy current flowing into electrical device 300 due to an electromagnetic field during power transfer.

Since power transmission coil 450 is arranged such that winding centerline CL extends through cover portion 620A and installation wall 610, many magnetic fluxes from power transmission coil 450 flow toward a region below power transmission coil 450 during power transfer. Therefore, the amount of magnetic fluxes passing through partitioning wall 660 is larger than the amount of magnetic fluxes passing through main surface wall 620 constituting outer wall 601.

Partitioning wall 660 is made of a metal material higher in conductivity than main surface wall 620 constituting outer wall 601. Even if many magnetic fluxes pass through partitioning wall 660, generation of heat that would be caused by an eddy current produced in partitioning wall 660 can be restrained since partitioning wall 660 is higher in conductivity. Accordingly, degradation of ferrite plate 460 and a temperature rise in electrical-device storing portion 520 in which electrical device 300 is stored can be restrained.

Although in the present embodiment, enclosure 600 is formed in the flat box-like shape, the shape of enclosure 600 is not limited to this. For example, enclosure 600 may have a hemispherical shape or a dome-like shape.

During power transfer, magnetic fluxes passing through hole 450a increase. Although partitioning wall 660 restrains most of these magnetic fluxes from entering electrical-device storing portion 520, some magnetic fluxes enter electrical-device storing portion 520.

As shown in FIGS. 4 and 5, switching power supply 701, filter inductors 716, 720, and filter capacitors 717, 721 are arranged at positions distant from a region located between hole 450a of power transmission coil 450 and installation wall 610.

Therefore, the magnetic fluxes having passed through partitioning wall 660 can be restrained from reaching switching power supply 701, filter inductors 716, 720, filter capacitors 717, 721, and DC/RF portion 706.

Here, switching power supply 701, filter inductors 716, 720, filter capacitors 717, 721, and DC/RF portion 706 have a great influence on the frequency of electric current supplied to power transmission coil 450. If the power transmission frequency deviates from a predetermined value (a resonance frequency of an LC resonator formed by power transmission coil 450 and capacitor 420), the power transmission efficiency will drop significantly.

Thus, by restraining magnetic fluxes originated in power transmission coil 450 from reaching switching power supply 701, filter inductors 716, 720, filter capacitors 717, 721, and DC/RF portion 706 as described above, degradation in the power transmission efficiency can be restrained.

In the example shown in FIGS. 4 and 5, switching power supply 701, filter inductors 716, 720, filter capacitors 717, 721, and DC/RF portion 706 are all arranged at positions distant from the region below hole 450a, however, at least one of these devices may be arranged at a position distant from the region between hole 450a and installation wall 610.

Since 24V power supply 708 and the like have a smaller influence on the power transmission efficiency than switching power supply 701, filter inductors 716, 720, filter capacitors 717, 721, and DC/RF portion 706. Thus, 24V power supply 708 is arranged under hole 450a of power transmission coil 450.

In a method for manufacturing power transmission device 50 having the above-described structure, by slidingly inserting electrical device 300 into a part of enclosure 600 having main surface wall 620, sidewall 630 and installation wall 610 molded integrally from the forward direction and backward direction (directions F) of the vehicle, and then assembling sidewall 630, partitioning wall 660, power transmission coil unit 400, and cover portion 620A located in the longitudinal direction of the vehicle, power transmission device 50 is completed. In this way, power transmission device 50 can be easily constructed. In particular, the enclosure in which main surface wall 620, sidewall 630 and installation wall 610 are integrated and in which sidewall 630 does not have walls in the longitudinal direction of the vehicle can be easily manufactured by extrusion molding or casting.

Power transmission device 50 in the present first embodiment is power transmission device 50 in which power transmission coil unit 400 and electrical device 300 are stored in the same enclosure 600, and power transmission coil unit 400 and electrical device 300 are integrated.

Second Embodiment

Figure 6:
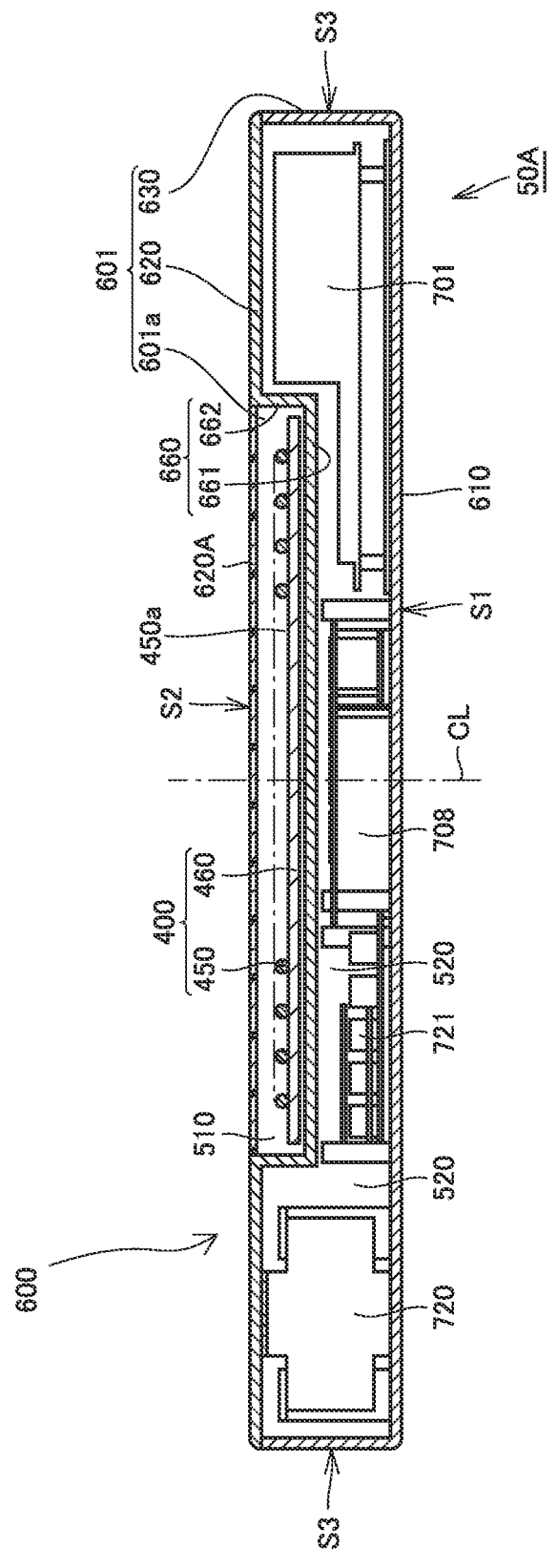
FIG. 6 is a diagram showing a cross-sectional structure of a power transmission device according to a second embodiment.
Figure 7:
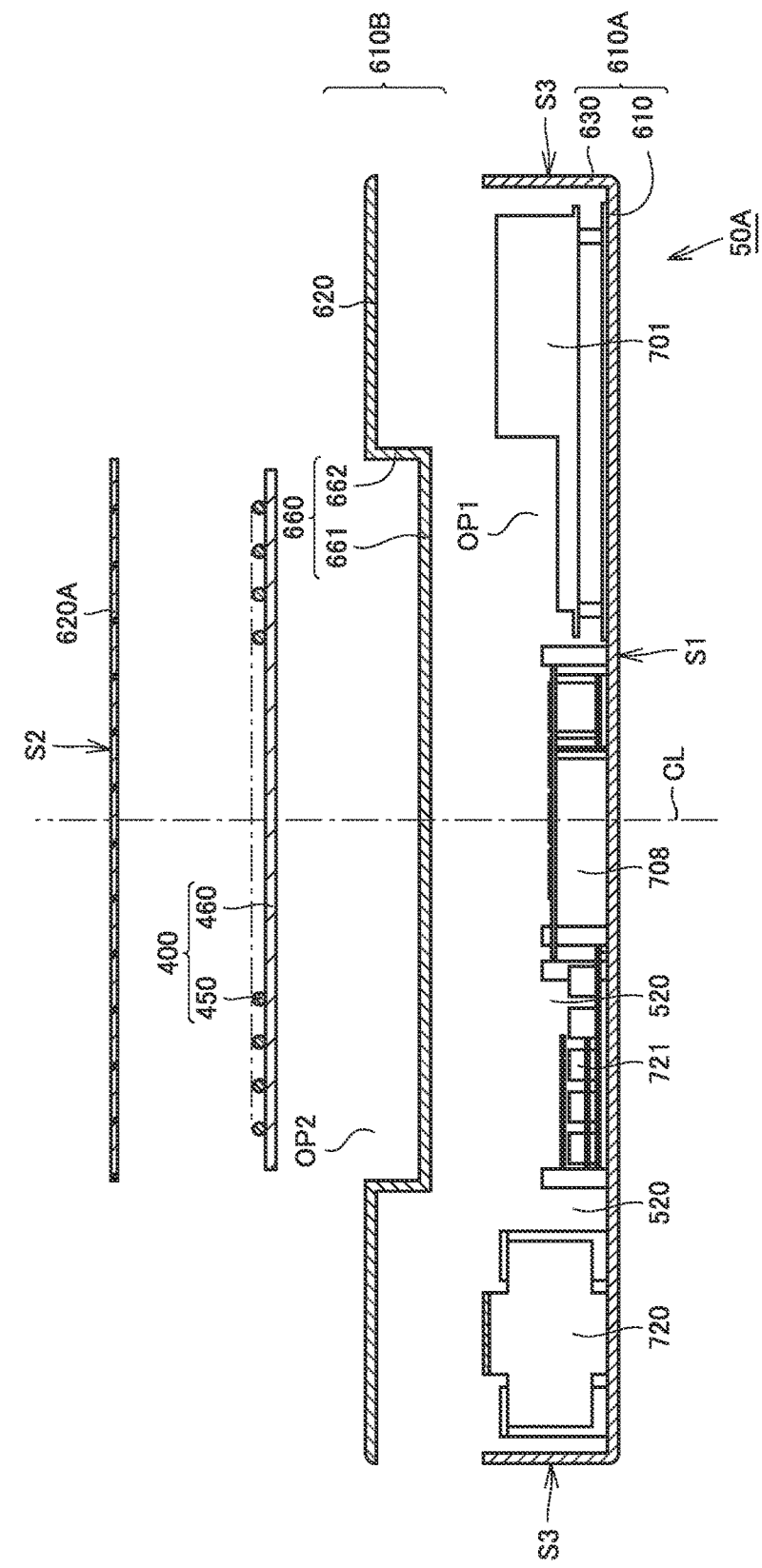
FIG. 7 is a first exploded cross-sectional view showing a method for manufacturing a power transmission device according to the second embodiment.
Figure 8:
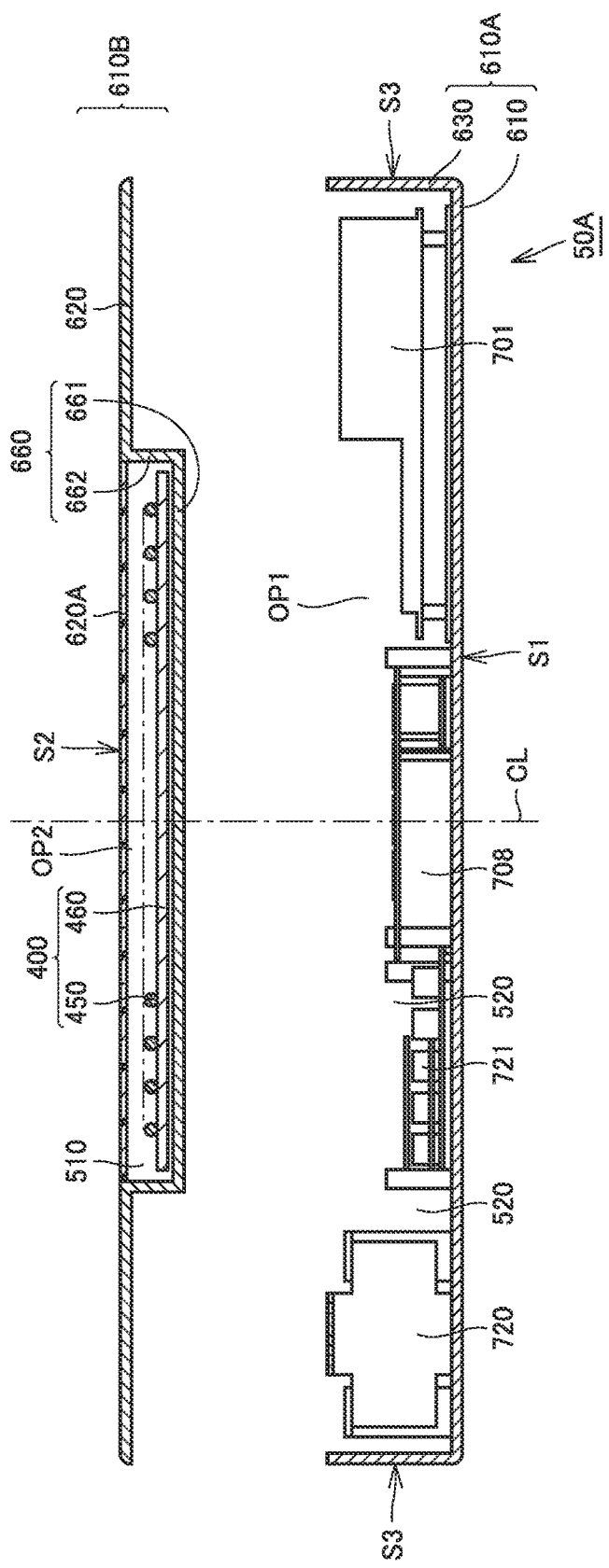
FIG. 8 is a second exploded cross-sectional view showing a method for manufacturing a power transmission device according to the second embodiment.

Next, referring to FIGS. 6 to 8, a structure of a power transmission device 50A according to a second embodiment will be described. FIG. 6 is a diagram showing a cross-sectional structure of power transmission device 50A according to the present embodiment. FIGS. 7 and 8 are first and second exploded cross-sectional views each showing a method for manufacturing a power transmission device according to the present embodiment.

A difference from power transmission device 50 according to the above-described first embodiment lies in the structure of an enclosure 600A, and the structures of power transmission coil unit 400 and electrical device 300 are identical to those of the first embodiment. Therefore, the structure of enclosure 600A will be described below.

Enclosure 600A according to the present embodiment generally has a similar structure to that of enclosure 600 according to the above-described first embodiment. Enclosure 600A has a difference in that main surface wall 620 constituting part of outer wall 601 is integrally made of a metal material identical to that of partitioning wall 660, and opening 601a to be closed with cover portion 620A is formed by partitioning wall 660, while in enclosure 600, main surface wall 620, sidewall 630 and installation wall 610 constituting outer wall 601 are integrally molded from metal.

In the present embodiment, cover portion 620A is made of resin similarly to the first embodiment. Sidewall 630 and installation wall 610 are integrally molded from metal, and an aluminum member is used as an example in the present embodiment. While sidewall 630 is a side surface located in the width direction (W) of the vehicle, an aluminum member of a different composition from installation wall 610 and the like is used for sidewall 640 (see FIGS. 2 and 3) located in the forward direction/backward direction of the vehicle. Sidewall 640 (see FIGS. 2 and 3) located in the forward direction/backward direction of the vehicle may be molded integrally with sidewall 630 and installation wall 610.

Main surface wall 620 and partitioning wall 660 are integrally molded from metal, and a copper member is used as an example in the present embodiment. Partitioning wall 660 has bottom wall 661 located on the installation wall 610 side and sidewall 662 standing up from the both ends of bottom wall 661 toward the main surface wall 620 side. Main surface wall 620 is formed to extend outwardly from the upper end of sidewall 662. Main surface wall 620 and partitioning wall 660 integrally molded constitute a cover member that closes an opening formed by sidewall 630 and installation wall 610. Partitioning wall 660 forms a recess recessed to the installation surface S1 side.

Even in the case of using enclosure 600A having the above-described structure, functions and effects similar to those of enclosure 600 according to the first embodiment can be obtained.

Referring to FIGS. 7 and 8, a method for manufacturing power transmission device 50A having the above-described structure will be described. Hereinbelow, a housing formed by sidewall 630 and installation wall 610 will be referred to as a main enclosure 610A, and a cover formed by main surface wall 620 and partitioning wall 660 will be referred to as a cover member 610B.

FIG. 7 shows the state where power transmission device 50A has been disassembled. Within box-shaped main enclosure 610A with its upper part being open, components constituting electrical device 300 are stored at predetermined positions. Then, an opening OP1 of main enclosure 610A is closed with cover member 610B, and power transmission coil unit 400 is arranged in the recess of partitioning wall 660 of cover member 610B. Then, an opening OP2 of partitioning wall 660 is closed with cover portion 620A. Power transmission device 50A is thereby completed.

The above-described manufacturing steps are merely an example and are not limited to the above-described steps. As another manufacturing method, a manufacturing method shown in FIG. 8 can be adopted. As shown in FIG. 8, within box-shaped main enclosure 610A with its upper part being open, components constituting electrical device 300 are stored at predetermined positions. On the other hand, steps may be adopted in which power transmission coil unit 400 is previously arranged on the inner side of partitioning wall 660 of cover member 610B, cover member 610B with opening OP2 of partitioning wall 660 closed with cover portion 620A is prepared, and opening OP1 of main enclosure 610A in which electrical device 300 is stored is closed with this cover member 610B. Adopting these steps can facilitate the manufacturing process.

According to this manufacturing method shown in FIG. 8, power transmission coil unit 400 can be protected by storing power transmission coil unit 400 in cover member 610B. Accordingly, power transmission coil unit 400 can be protected when cover member 610B in which power transmission coil unit 400 is stored is kept in a factory, and in the step of integrating cover member 610B and main enclosure 610A, for example. Accordingly, it is possible to restrain a crack and the like from occurring in ferrite plate 460 of power transmission coil unit 400.

Power transmission device 50A according to the present embodiment can also achieve functions and effects similar to those of power transmission device 50 according to the first embodiment.

Third Embodiment: Details of Power Reception Device 10

Figure 11:
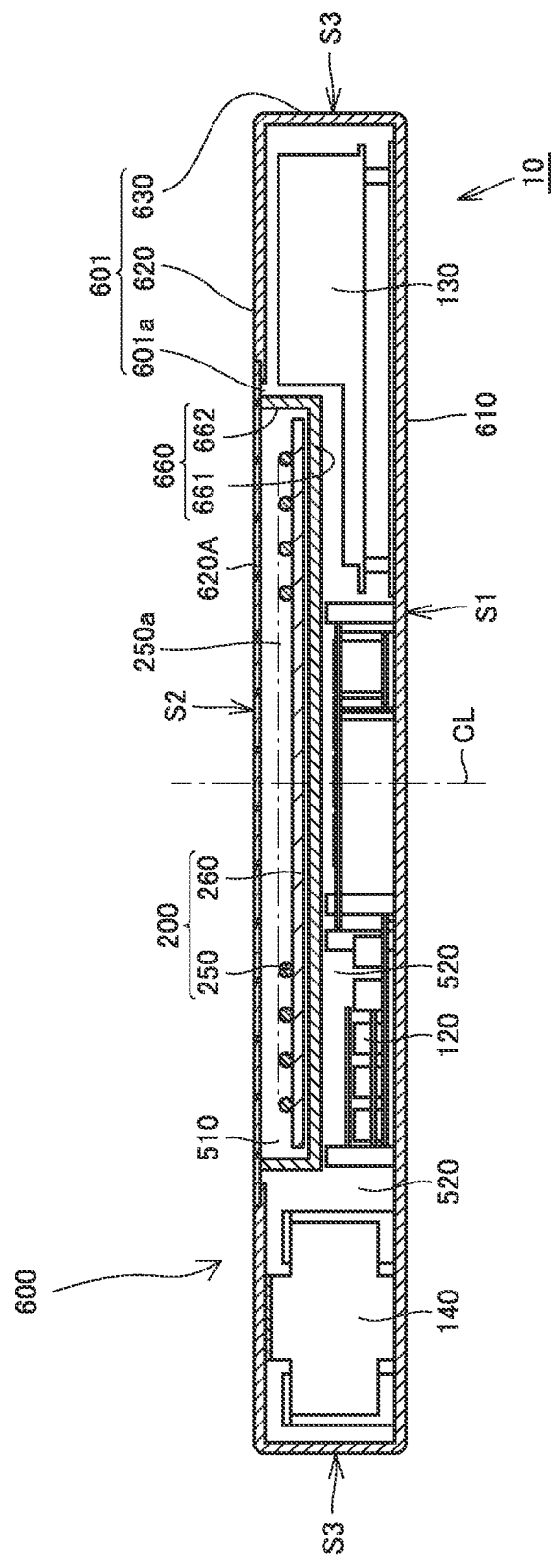
FIG. 11 is a diagram showing a cross-sectional structure of the power reception device according to the third embodiment.

Referring to FIGS. 9 to 11, a detailed structure of power reception device 10 according to the present embodiment will be described. FIG. 9 is a perspective view showing a structure of power reception device 10 in which a spiral coil is adopted as the power reception device. FIG. 10 is a perspective view showing a structure of power reception device 10 in which a wound-type coil is adopted as the power reception device. FIG. 11 is a cross-sectional view taken along the arrows XI-XI in FIG. 9.

Power reception device 10 has power reception coil unit 200 that receives electric power in a contactless manner from power transmission device 50 as described above and electrical device 110 provided between power reception coil unit 200 and battery 150 as a power storage device that stores electric power received by power reception coil unit 200. These power reception coil unit 200 and electrical device 110 are stored in enclosure 600. Therefore, power reception device 10 according to the present embodiment has a structure in which power reception coil unit 200 and electrical device 110 are integrated. Since the structure of enclosure 600 is the same as that of power transmission devices 50 and 50A described above, description will be made using the same reference numbers.

Referring to FIGS. 9 and 10, in the present embodiment, electrical device 110 at least includes capacitor 120, rectifier 130 and DC/DC converter 140 as shown in FIG. 1.

Referring to in FIG. 11, in the present embodiment, power reception coil unit 200 and electrical device 110 are stored in enclosure 600. In this example shown in FIG. 11, power reception coil 250 is a spiral coil of a planar shape formed so as to surround winding centerline CL, and has a hole 250a formed in the central portion. Power reception coil 250 is arranged such that winding centerline CL extends through cover portion 620A and installation wall 610. In this example shown in FIG. 11, power reception coil 250 is arranged such that winding centerline CL extends in the vertical direction. As power reception coil 250, a spiral coil arranged such that winding centerline CL extends in the vertical direction may be adopted.

Enclosure 600 has a flat box-like shape as a whole, and includes installation surface S1 arranged on the vehicle side and power reception surface S2 arranged on the power transmission device 50 side. Enclosure 600 includes installation wall 610 located on the installation surface S1 side, outer wall 601 provided to cover installation wall 610 and leaving space within enclosure 600, and partitioning wall 660 partitioning the space within enclosure 600.

Outer wall 601 includes main surface wall 620 having opening 601a formed in power reception surface S2 and provided on the power reception surface S2 side, and sidewall 630 located on the side surface S3 side. Sidewall 630 is located between installation wall 610 and main surface wall 620.

Partitioning wall 660 partitions enclosure 600 into coil-unit storing portion 510 in which power reception coil unit 200 provided on the power reception surface S2 side is stored, and electrical-device storing portion 520 in which electrical device 110 is stored.

Cover portion 620A that closes opening 601a is located in coil-unit storing portion 510. Cover portion 620A is made of resin or the like that transmits an electromagnetic field. Electric power transmitted from power transmission coil unit 400 can thereby be received by power reception coil unit 200 stored in coil-unit storing portion 510.

Outer wall 601 is made of metal. Specifically, main surface wall 620, sidewall 630 and installation wall 610 are made of metal and molded integrally, and in the present embodiment, an aluminum member is used as an example. By making outer wall 601 of metal, it is possible to restrain noise originated in electrical device 110 stored in electrical-device storing portion 520 from leaking to the outside through outer wall 601.

Since installation wall 610 is generally installed on the vehicle side, it is possible to restrain noise originated in electrical device 110 from leaking to the outside from the installation wall 610 side. In the example shown in FIG. 11, installation wall 610 is also made of metal to also restrain leakage of noise through installation wall 610.

In this example shown in FIG. 11, the whole surface of main surface wall 620 and the whole surface of sidewall 630 are made of metal, however, part of main surface wall 620 may be made of a porous plastic having waterproofness and air permeability, or the like.

That is, also in the present embodiment, the expression "the outer wall is made of metal" is not limited to the case where the whole surface of outer wall 601 is made of metal, but also encompasses the case where part of outer wall 601 is made of an air-permeable plastic for ensuring air permeability and the case where part of outer wall 601 is made of glass or transparent resin for observing the interior.

Sidewall 630 is a side surface located in the width direction (W) of the vehicle. A sidewall 640 (see FIGS. 9 and 10) located in the forward direction/backward direction of the vehicle is implemented by an aluminum member of different composition from installation wall 610 and the like.

Partitioning wall 660 has bottom wall 661 located on the installation wall 610 side and sidewall 662 standing up from the both ends of bottom wall 661 toward cover portion 620A. Since partitioning wall 660 needs to prevent the occurrence of influence caused by an electromagnetic field on electrical device 110 stored in the same enclosure 600, partitioning wall 660 is implemented by an electromagnetic-field shielding member. Although a metal material is mainly adopted for the electromagnetic-field shielding member, copper is adopted in the present embodiment.

By partitioning enclosure 600 into coil-unit storing portion 510 in which power reception coil unit 200 is stored and electrical-device storing portion 520 in which electrical device 110 is stored with partitioning wall 660 made of metal, it is possible to reduce the influence on electrical device 110 caused by an electromagnetic field during power reception. For example, it is possible to prevent the temperature rise of electrical device 110 that would be caused by the occurrence of an eddy current flowing into electrical device 110 due to an electromagnetic field during power reception.

Since power reception coil 250 is arranged such that winding centerline CL extends through cover portion 620A and installation wall 610, many magnetic fluxes from power reception coil 250 flow toward a region below power reception coil 250 during power reception. Therefore, the amount of magnetic fluxes passing through partitioning wall 660 is larger than the amount of magnetic fluxes passing through main surface wall 620 constituting outer wall 601.

Partitioning wall 660 is made of a metal material higher in conductivity than main surface wall 620 constituting outer wall 601. Even if many magnetic fluxes pass through partitioning wall 660, generation of heat that would be caused by an eddy current produced in partitioning wall 660 can be restrained since partitioning wall 660 is higher in conductivity. Accordingly, degradation of ferrite plate 260 and a temperature rise in electrical-device storing portion 520 in which electrical device 110 is stored can be restrained.

Although in the present embodiment, enclosure 600 is formed in the flat box-like shape, the shape of enclosure 600 is not limited to this. For example, enclosure 600 may have a hemispherical shape or a dome-like shape.

During power reception, magnetic fluxes passing through hole 250a increase. Although partitioning wall 660 restrains most of these magnetic fluxes from entering electrical-device storing portion 520, some magnetic fluxes enter electrical-device storing portion 520.

As shown in FIG. 11, rectifier 130 and DC/DC converter 140 are arranged at positions distant from a region located between hole 250a of power reception coil 250 and installation wall 610.

Therefore, the magnetic fluxes having passed through partitioning wall 660 can be restrained from reaching rectifier 130 and DC/DC converter 140. A plurality of switching elements are mounted on rectifier 130 and DC/DC converter 140. If exposed to high-intensity magnetic fluxes, these elements are likely to malfunction to degrade in charging efficiency. Thus, by restraining magnetic fluxes from reaching rectifier 130 and DC/DC converter 140 as described above, rectifier 130 and DC/DC converter 140 can be restrained from malfunctioning.

If a deviation occurs in Duty (ratio between ON/OFF times) of DC/DC converter 140, the impedance of power reception device 10 will vary greatly, which significantly reduces electric power received by power reception device 10. Therefore, DC/DC converter 140 is arranged at a position farther from the region between hole 250a of power reception coil 250 and installation wall 610 than rectifier 130. This can restrain the impedance of power reception device 10 from varying.

In a method for manufacturing power reception device 10 having the above-described structure, by slidingly inserting electrical device 110 into a part of enclosure 600 having main surface wall 620, sidewall 630 and installation wall 610 molded integrally from the forward direction and backward direction (directions F) of the vehicle, and then assembling sidewall 640, partitioning wall 660, power reception coil unit 200, and main surface wall 620 located in the longitudinal direction of the vehicle, power reception device 10 is completed.

Power reception device 10 in the present third embodiment is power reception device 10 in which power reception coil unit 200 and electrical device 110 are stored in the same enclosure 600, and power reception coil unit 200 and electrical device 110 are integrated.

Fourth Embodiment

Figure 12:
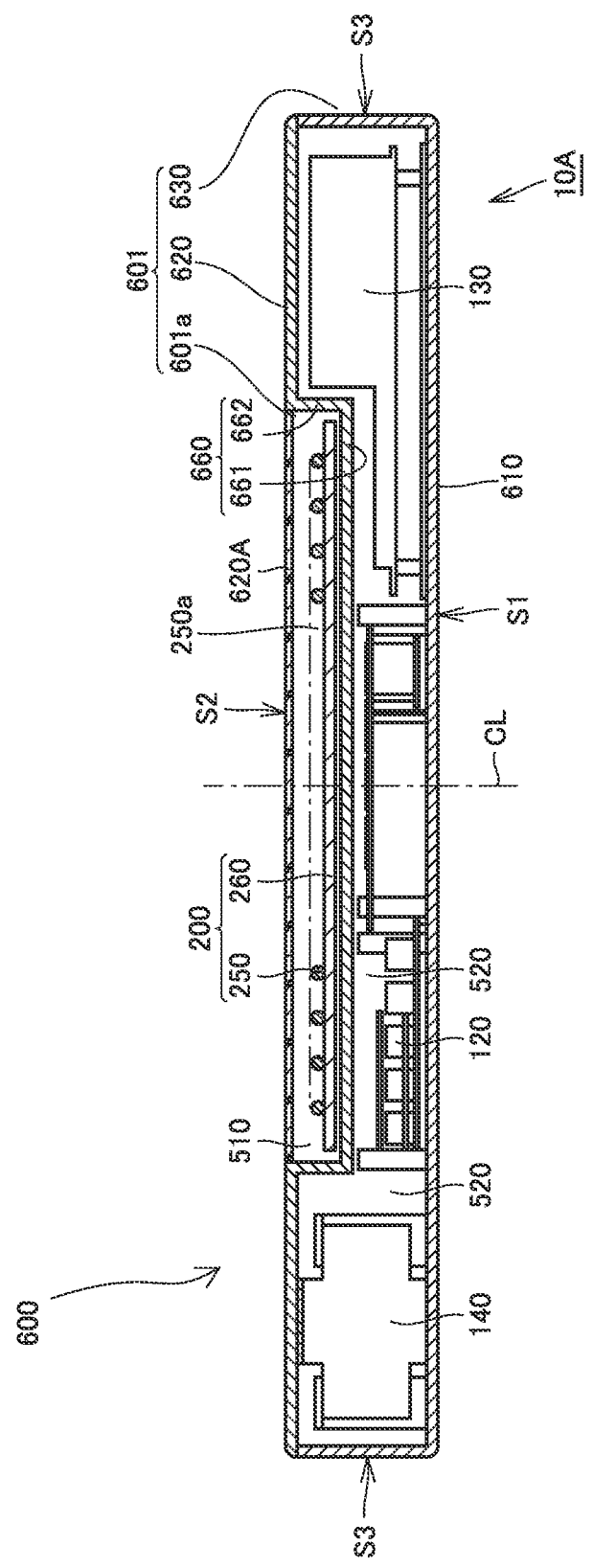
FIG. 12 is a diagram showing a cross-sectional structure of a power reception device according to a fourth embodiment.
Figure 13:
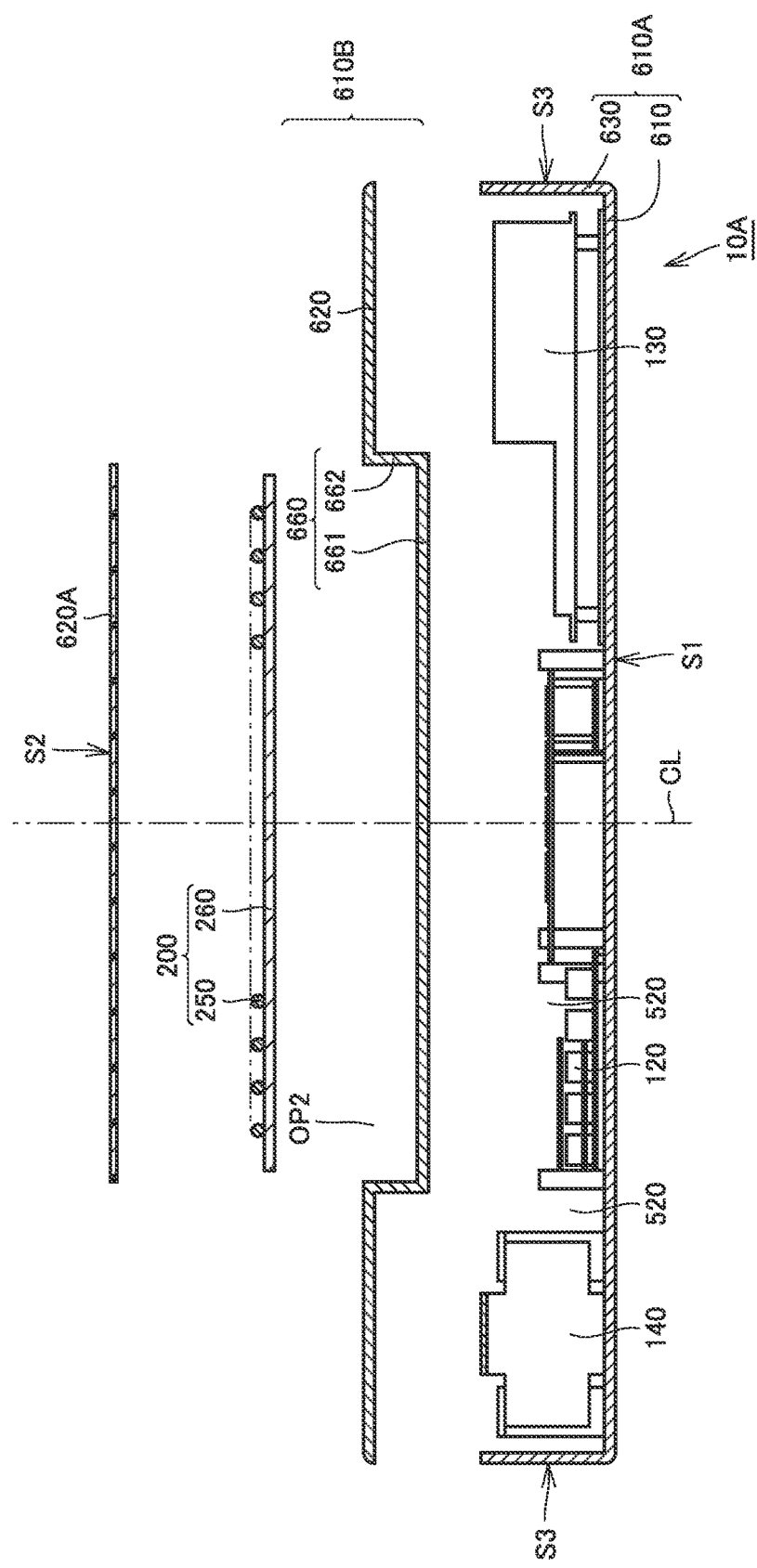
FIG. 13 is a first exploded cross-sectional view showing a method for manufacturing a power transmission device according to the fourth embodiment.
Figure 14:
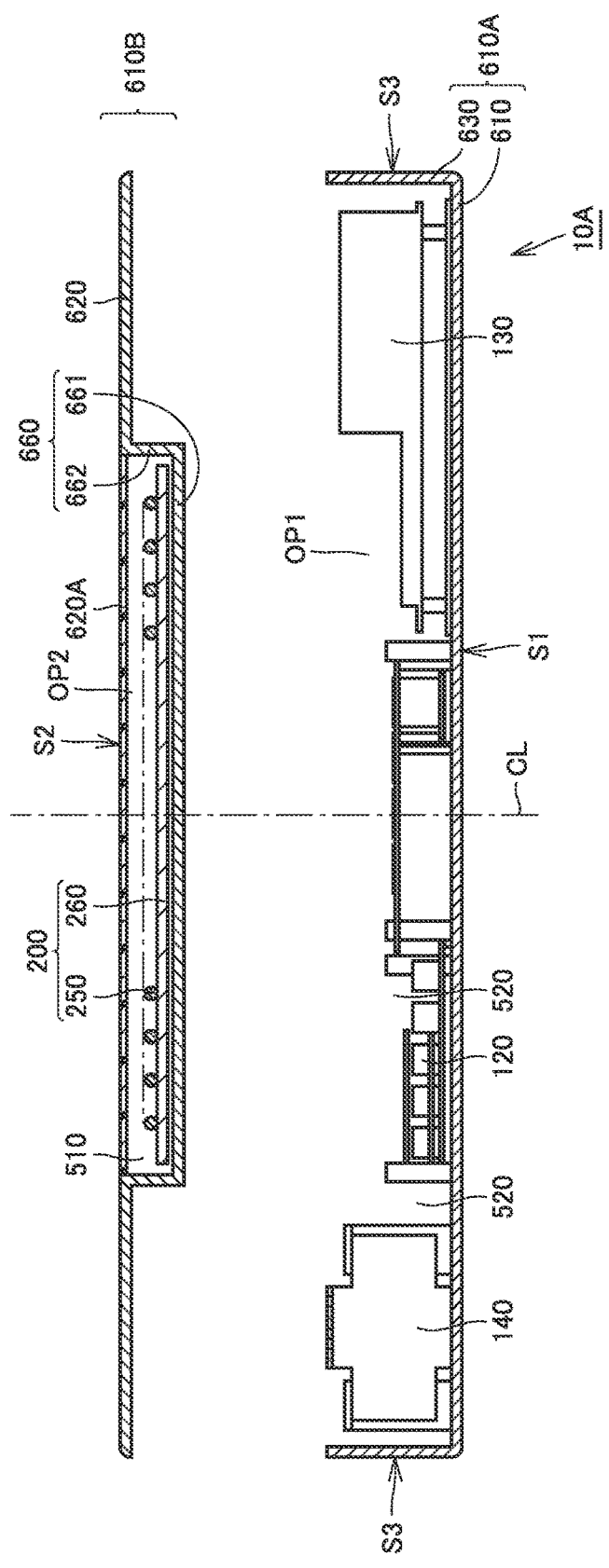
FIG. 14 is a second exploded cross-sectional view showing a method for manufacturing a power transmission device according to the fourth embodiment.

Next, referring to FIGS. 12 to 14, a structure of a power reception device 10A according to a fourth embodiment will be described. FIG. 12 is a diagram showing a cross-sectional structure of power reception device 10A according to the present embodiment. FIGS. 13 and 14 are first and second exploded cross-sectional views each showing a method for manufacturing a power reception device according to the present embodiment.

A difference from power reception device 10 according to the above-described third embodiment lies in the structure of enclosure 600A, and the structures of power reception coil unit 200 and electrical device 110 are identical to those of the third embodiment. Therefore, the structure of enclosure 600A will be described below.

Enclosure 600A according to the present embodiment generally has a similar structure to that of enclosure 600 according to the above-described third embodiment. Enclosure 600A has a difference in that main surface wall 620 constituting part of outer wall 601 is integrally made of a metal material identical to that of partitioning wall 660, and opening 601a to be closed with cover portion 620A is formed by partitioning wall 660, while in enclosure 600, main surface wall 620, sidewall 630 and installation wall 610 constituting outer wall 601 are integrally molded from metal.

In the present embodiment, cover portion 620A is made of resin similarly to the third embodiment. Sidewall 630 and installation wall 610 are integrally molded from metal, and an aluminum member is used as an example in the present embodiment. While sidewall 630 is a side surface located in the width direction (W) of the vehicle, an aluminum member of a different composition from installation wall 610 and the like is used for sidewall 640 (see FIGS. 2 and 3) located in the forward direction/backward direction of the vehicle. Sidewall 640 (see FIGS. 9 and 10) located in the forward direction/backward direction of the vehicle may be molded integrally with sidewall 630 and installation wall 610.

Main surface wall 620 and partitioning wall 660 are integrally molded from metal, and a copper member is used as an example in the present embodiment. Partitioning wall 660 has bottom wall 661 located on the installation wall 610 side and sidewall 662 standing up from the both ends of bottom wall 661 toward the main surface wall 620. Main surface wall 620 is formed to extend outwardly from the upper end of sidewall 662. Main surface wall 620 and partitioning wall 660 integrally molded constitute a cover member that closes an opening formed by sidewall 630 and installation wall 610. Partitioning wall 660 forms a recess recessed to the installation surface S1 side.

Even in the case of using enclosure 600A having the above-described structure, functions and effects similar to those of enclosure 600 according to the third embodiment can be obtained.

Referring to FIGS. 13 and 14, a method for manufacturing power reception device 10A having the above-described structure will be described. Hereinbelow, a housing formed by sidewall 630 and installation wall 610 will be referred to as main enclosure 610A, and a cover formed by main surface wall 620 and partitioning wall 660 will be referred to as cover member 610B.

FIG. 13 shows the state where power reception device 10A has been disassembled. Within box-shaped main enclosure 610A with its upper part being open, components constituting electrical device 110 are stored at predetermined positions. Then, opening OP1 of main enclosure 610A is closed with cover member 610B, and power reception coil unit 200 is arranged in the recess of partitioning wall 660 of cover member 610B. Then, opening OP2 of partitioning wall 660 is closed with cover portion 620A. Power reception device 10A is thereby completed.

The above-described manufacturing steps are merely an example and are not limited to the above-described steps. As another manufacturing method, a manufacturing method shown in FIG. 14 can be adopted. As shown in FIG. 14, within box-shaped main enclosure 610A with its upper part being open, components constituting electrical device 110 are stored at predetermined positions. On the other hand, steps may be adopted in which power reception coil unit 200 is previously arranged on the inner side of partitioning wall 660 of cover member 610B, cover member 610B with opening OP2 of partitioning wall 660 closed with cover portion 620A is prepared, and closing opening OP1 of main enclosure 610A in which electrical device 110 is stored is closed with this cover member 610B. Adopting these steps can facilitate the manufacturing process.

Power reception device 10A according to the present embodiment can also achieve functions and effects similar to those of power reception device 10 according to the third embodiment.

Although the embodiments of the present invention have been described above, the embodiments disclosed herein are illustrative and not limitative in any respect. The technical scope of the present invention is defined by the terms of the claims, and is intended to include any modifications within the scope and meaning equivalent to the terms of the claims.

REFERENCE SIGNS LIST 10, 10A power reception device; 50, 50A power transmission device; 100 electric vehicle; 105 vehicle main body; 110, 300 electrical device; 120, 220, 420 capacitor; 130 rectifier; 140 converter; 150 battery; 160 power control unit; 170 motor unit; 180, 322 communication unit; 200 power reception coil unit; 250 power reception coil; 260, 460 ferrite plate; 310 high-frequency power device; 330 AC power supply; 400 power transmission coil unit; 450 power transmission coil; 510 coil-unit storing portion; 520 electrical-device storing portion; 600, 600A enclosure; 601 outer wall; 601a opening; 610 installation wall; 610A main enclosure; 610B cover member; 620 main surface wall; 620A cover portion; 630 sidewall; 660 partitioning wall; 661 bottom wall; 662 sidewall; 701 switching power supply; 704 sub-substrate; 705, 710, 712, 714, 715, 718, 719 fan; 707, 708 power supply; 709 resonance capacitor; 711, 713 heat sink; 716, 720 filter inductor; 717, 721 filter capacitor; 723 interface; 1000 power transfer system.

The invention claimed is:

1. A power transmission device that transmits electric power to a power reception device in a contactless manner, comprising:
a power transmission coil unit;
an electrical device connected to said power transmission coil unit; and
an enclosure configured to store said power transmission coil unit and said electrical device,
said enclosure including
an installation wall located on the side of an installation surface, an outer wall provided to cover said installation wall from the side of a side surface and leaving space in said enclosure,
a partitioning wall configured to partition said space, and
a cover portion configured to close an opening formed in a power transmission surface of said outer wall and to allow transmission of electric power by said power transmission coil unit,
said partitioning wall being provided to partition said space in said enclosure into a coil-unit storing portion in which said cover portion is located and said power transmission coil unit is stored, and an electrical-device storing portion in which said electrical device is stored,
said outer wall and said partitioning wall being made of metal,
said outer wall having a main surface wall having said opening formed therein and provided on the side of said power transmission surface, and a sidewall located on the side of said side surface,
said power transmission coil unit including a power transmission coil,
said power transmission coil having a hole formed therein and being arranged such that a winding axis extends through said cover portion and said installation wall,
said electrical device at least including a filter device portion, an AC/DC device portion and a DC/RF device portion, and
at least one of said filter device portion, said AC/DC device portion and said DC/RF device portion being arranged at a position distant from a region located between said hole in said power transmission coil and said installation wall.

2. The power transmission device according to claim 1, wherein said partitioning wall is higher in conductivity than said outer wall.

3. The power transmission device according to claim 1, wherein
said main surface wall and said partitioning wall are formed integrally, and
said installation wall and said sidewall are formed integrally.

4. The power transmission device according to claim 1, wherein said installation wall is made of metal.

5. The power transmission device according to claim 1, wherein said power transmission coil unit includes a flat ferrite plate and a spiral coil arranged on the side of said power transmission surface with respect to said ferrite plate.

6. A method for manufacturing a power transmission device that transmits electric power to a power reception device in a contactless manner,
said power transmission device including
a power transmission coil unit,
an electrical device connected to said power transmission coil unit, and
an enclosure configured to store said power transmission coil unit and said electrical device,
said enclosure including
an installation wall located on the side of an installation surface,
an outer wall provided to cover said installation wall from the side of a side surface and leaving space in said enclosure,
a partitioning wall configured to partition said space and recessed toward said installation surface, and
a cover portion configured to close an opening formed in a power transmission surface of said outer wall and to allow transmission of electric power by said power transmission coil unit,
said partitioning wall being provided to partition said space in said enclosure into a coil-unit storing portion in which said cover portion is located and said power transmission coil unit is stored, and an electrical-device storing portion in which said electrical device is stored,
said outer wall and said partitioning wall being made of metal,
said outer wall having
a main surface wall having said opening formed therein and provided on the side of said power transmission surface, and
a sidewall located on the side of said side surface,
said enclosure including
a main enclosure in which said installation wall and said sidewall are formed integrally, and
a cover member in which said partitioning wall and said main surface wall are formed integrally, and which closes an opening in said main enclosure,
said method comprising the steps of:
storing said electrical device in said main enclosure;
closing, with said cover member, the opening in said main enclosure in which said electrical device is stored;
arranging said power transmission coil unit on an inner side of said partitioning wall of said cover member; and
closing an opening in said partitioning wall with said cover portion.

7. The method for manufacturing a power transmission device according to claim 6, wherein, after arranging said power transmission coil unit in said partitioning wall of said cover member and closing the opening in said partitioning wall with said cover portion, the opening in said main enclosure in which said electrical device is stored is closed with said cover member.

8. A power reception device that receives electric power from a power transmission device in a contactless manner, comprising:
a power reception coil unit;
an electrical device connected to said power reception coil unit; and
an enclosure configured to store said power reception coil unit and said electrical device,
said enclosure including
an installation wall located on the side of an installation surface,
an outer wall provided to cover said installation wall from the side of a side surface and leaving space in said enclosure,
a partitioning wall configured to partition said space, and
a cover portion configured to close an opening formed in a power reception surface of said outer wall and to allow reception of electric power by said power reception coil unit,
said partitioning wall being provided to partition said space in said enclosure into a coil-unit storing portion in which said cover portion is located and said power reception coil unit is stored, and an electrical-device storing portion in which said electrical device is stored,
said outer wall and said partitioning wall being made of metal,
said outer wall having a main surface wall having said opening formed therein and provided on the side of said power reception surface, and a sidewall located on the side of said side surface, said power reception coil unit including a power reception coil, said power reception coil having a hole formed therein and being arranged such that a winding axis extends through said cover portion and said installation wall, said electrical device at least including a capacitor, a rectifier and a DC/DC converter, and at least one of said rectifier and said DC/DC converter being arranged at a position distant from a region located between said hole in said power reception coil and said installation wall.

9. The power reception device according to claim 8, wherein said partitioning wall is higher in conductivity than said outer wall.

10. The power reception device according to claim 8, wherein said main surface wall and said partitioning wall are formed integrally, and said installation wall and said sidewall are formed integrally.

11. The power reception device according to claim 8, wherein said installation wall is made of metal.

12. The power reception device according to claim 8, wherein said power reception coil unit includes a flat ferrite plate and a spiral coil arranged on the side of said power reception surface with respect to said ferrite plate.

13. A method for manufacturing a power reception device that receives electric power from a power transmission device in a contactless manner, said power reception device including
a power reception coil unit,
an electrical device connected to said power reception coil unit, and
an enclosure configured to store said power reception coil unit and said electrical device, said enclosure including
an installation wall located on the side of an installation surface,
an outer wall provided to cover said installation wall from the side of a side surface and leaving space in said enclosure,
a partitioning wall configured to partition said space and recessed toward said installation surface, and
a cover portion configured to close an opening formed in a power reception surface of said outer wall and to allow reception of electric power by said power reception coil unit, said partitioning wall being provided to partition said space in said enclosure into a coil-unit storing portion in which said cover portion is located and said power reception coil unit is stored, and an electrical-device storing portion in which said electrical device is stored, said outer wall and said partitioning wall being made of metal, said outer wall having
a main surface wall having said opening formed therein and provided on the side of said power reception surface, and
a sidewall located on the side of said side surface, said enclosure including
a main enclosure in which said installation wall and said sidewall are formed integrally, and
a cover member in which said partitioning wall and said main surface wall are formed integrally, and which closes an opening in said main enclosure, said method comprising the steps of:
storing said electrical device in said main enclosure;
closing, with said cover member, the opening in said main enclosure in which said electrical device is stored;
arranging said power reception coil unit on an inner side of said partitioning wall of said cover member; and
closing an opening in said partitioning wall with said cover portion.

14. The method for manufacturing a power reception device according to claim 13, wherein, after arranging said power reception coil unit on the inner side of said partitioning wall of said cover member and closing the opening in said partitioning wall with said cover portion, the opening in said main enclosure in which said electrical device is stored is closed with said cover member.

* * * * *